United States Patent
Jang et al.

(10) Patent No.: US 7,831,714 B2
(45) Date of Patent: Nov. 9, 2010

(54) DISPLAY APPARATUS MANAGEMENT SYSTEM AND METHOD THEREOF

(75) Inventors: Mi-sook Jang, Gyeonggi-do (KR); Kyung-shik Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1218 days.

(21) Appl. No.: 10/967,293

(22) Filed: Oct. 19, 2004

(65) Prior Publication Data

US 2005/0132036 A1 Jun. 16, 2005

(30) Foreign Application Priority Data

Dec. 13, 2003 (KR) ................ 2003-90923

(51) Int. Cl.
G06F 15/16 (2006.01)
(52) U.S. Cl. .................. 709/227; 709/228; 345/2.1
(58) Field of Classification Search .............. 709/208, 709/223, 249, 227, 228; 345/533, 536–538, 345/541, 2.1–2.3, 520, 564
See application file for complete search history.

(56) References Cited

U.S. PATENT DOCUMENTS

| | | | | |
|---|---|---|---|---|
| 5,604,509 | A | * | 2/1997 | Moore et al. .............. 345/2.1 |
| 5,710,570 | A | * | 1/1998 | Wada et al. ............... 345/3.2 |
| 5,748,189 | A | * | 5/1998 | Trueblood ................ 715/755 |
| 5,781,434 | A | | 7/1998 | Tobita et al. |
| 5,959,686 | A | | 9/1999 | Jeong |

(Continued)

FOREIGN PATENT DOCUMENTS

JP 5-334033 12/1993

(Continued)

OTHER PUBLICATIONS

"Locking and Unlocking a Windows 2000 User Desktop;" Microsoft Corporation; retrieved via http://www.microsoft.com/technet/security/prodtech/windows2000/w2kccadm/routine/w2kadm35.mspx on Jul. 21, 2008; pp. 1-6.*

(Continued)

*Primary Examiner*—William C Vaughn, Jr.
*Assistant Examiner*—Thomas Richardson
(74) *Attorney, Agent, or Firm*—Staas & Halsey LLP (57) ABSTRACT

A display apparatus management system having at least one display apparatus with a display part to display an image, a memory to allow data to be stored and/or removes, and a display controller to control a display state of the image displayed on the display part; at least one client connected with each display apparatus and to output an image signal to the display apparatus; and a host having an input part to allow input of a display identification to each display apparatus, a database registered with the display identification of each display apparatus inputted via the input part and a client identification of each client, and a host controller to transfer the display identification to the display apparatus through the client to enable the display controller to store the display identification to the memory. The display apparatus management system, thus, identifies and/or manages the display apparatus connected with each client from the host. Further, by adding the lock function to the display apparatus, the present invention provides protection against a theft.

34 Claims, 7 Drawing Sheets

U.S. PATENT DOCUMENTS

| | | | | |
|---|---|---|---|---|
| 6,049,827 | A * | 4/2000 | Sugauchi et al. | 709/223 |
| 6,137,473 | A * | 10/2000 | Cortopassi et al. | 345/156 |
| 6,141,022 | A * | 10/2000 | Anfossi et al. | 345/545 |
| 6,199,180 | B1 | 3/2001 | Ote et al. | |
| 6,243,392 | B1 * | 6/2001 | Uemura et al. | 370/465 |
| 6,331,855 | B1 * | 12/2001 | Schauser | 345/502 |
| RE37,723 | E * | 6/2002 | Goren | 430/307 R |
| 6,447,396 | B1 * | 9/2002 | Galyean et al. | 463/40 |
| 6,567,092 | B1 * | 5/2003 | Bowen | 345/506 |
| 6,587,869 | B2 | 7/2003 | Sugauchi et al. | |
| 6,654,785 | B1 * | 11/2003 | Craig | 709/203 |
| 6,825,846 | B2 * | 11/2004 | Mondal | 345/547 |
| 6,989,836 | B2 * | 1/2006 | Ramsey | 345/522 |
| 7,025,678 | B2 * | 4/2006 | Oakes et al. | 463/40 |
| 7,167,919 | B2 * | 1/2007 | Iwamoto et al. | 709/229 |
| 7,171,461 | B2 * | 1/2007 | Ewing et al. | 709/223 |
| 7,180,475 | B2 * | 2/2007 | Slobodin et al. | 345/2.3 |
| 7,183,999 | B2 * | 2/2007 | Matthews et al. | 345/1.1 |
| 7,233,336 | B2 * | 6/2007 | Mondal | 345/547 |
| 7,260,624 | B2 * | 8/2007 | Sivertsen | 709/223 |
| 7,287,099 | B1 * | 10/2007 | Powderly et al. | 710/7 |
| 7,382,741 | B2 * | 6/2008 | Rao | 370/255 |
| 2002/0178387 | A1 | 11/2002 | Theron | |
| 2003/0110244 | A1 * | 6/2003 | Mondal | 709/223 |
| 2005/0232190 | A1 * | 10/2005 | Karaoguz et al. | 370/328 |

FOREIGN PATENT DOCUMENTS

| | | |
|---|---|---|
| JP | 6-217195 | 8/1994 |
| JP | 7-168692 | 7/1995 |
| JP | 2000-137660 | 5/2000 |
| KR | 1992-3475 | 5/1992 |
| KR | 1998-025431 | 7/1998 |
| KR | 175264 | 11/1998 |
| KR | 20-278216 | 5/2002 |

OTHER PUBLICATIONS

PCT International Search Report for application PCT/KR2004/002008, mailed on Oct. 10, 2004, 2 pages.

* cited by examiner

DISPLAY APPARATUS MANAGEMENT SYSTEM AND METHOD THEREOF

CROSS-REFERENCE TO RELATED APPLICATION

This application claims the benefit of Korean Patent Application No. 2003-90923, filed Dec. 13, 2003 in the Korean Intellectual Property Office, the disclosure of which is incorporated herein by reference.

BACKGROUND OF THE INVENTION

1. Field of the Invention

The present invention relates to a display apparatus management system, more particularly, to a display apparatus management system to identify and/or to manage a display device connected with each client from a host.

2. Description of the Related Art

As technology related to computers, displays, and networks advances, change is being made to the technology and manufacturing field related to displays and networks. Particularly, as network environments shift base from a central hosting approach having a central main frame to a client-server network approach, a network centering each server of a branch installed across a whole country or a globe is being formed. Accordingly, computers used in business enterprises or government organizations are mutually connected as a network, centering one (or more) server, while the server is connected with an outer network such as an Internet network. Herein, each computer connected with the server is given a unique address such as an Internet protocol (IP) address. Accordingly, a computer connected with the server became manageable while various technologies to control each computer from the server have been suggested.

However, although it is convenient to control a computer connected with the server from the server, a management technology of a monitor or a display apparatus, which is necessarily connected with a respective computer has been neglected.

Accordingly, the server is not supplied with information related to the monitor, such as a model name or a specification of the monitor. Even worse in some cases, the server is not able to substantially identify whether a computer is connected with a monitor. For example, it is inconvenient for a user who manages supplies and impossible for a host computer of a business enterprise to visually identify connection status of each monitor and each computer, and to visually identify each monitor to check if the monitor is stolen or damaged. Further, as cathode ray tubes (CRTs) are continually being replaced by a liquid crystal display (LCD), protection from theft has become more of a concern, and management of a monitor has become more necessary.

SUMMARY OF THE INVENTION

Accordingly, it is an aspect of the present invention to provide a display apparatus management system to identify and/or manage a display apparatus connected with each client from a host.

According to another aspect of the present invention, a display apparatus management system having a lock function of a display apparatus is provided.

Additional aspects and/or advantages of the invention will be set forth in part in the description which follows and, in part, will be obvious from the description, or may be learned by practice of the invention.

According to an aspect of the present invention, a display apparatus management system includes at least one display apparatus having a display part to display an image, a memory to store/remove data, and a display controller to control a display state of the image displayed on the display part; at least one client connected with each display apparatus and to apply an image signal to the display apparatus; and a host having an input part to provide a display identification (ID) to each display apparatus, a database registered with the display ID of each display apparatus inputted with the input part and a client ID given to each client, and a host controller to transfer the display ID to the display apparatus through the client to enable the display controller to store the display ID to the memory.

According to an aspect of the invention, the client further comprises: a client controller to control the display controller to control the display state of the image displayed on the display part, and the host controller transfers a control signal to the client controller to enable the client controller to control the display controller.

According to an aspect of the invention, the client controller requests transmission of the display ID to the display apparatus when the client is powered, and transmits the display ID received from the display apparatus to the host when the display ID is received from the display apparatus.

According to an aspect of the invention, the host controller transmits a display locking signal to the client to enable the client controller to implement a lock function when the display ID of the display apparatus received from the client is not identical to the display ID corresponding to the client ID registered in the database.

According to an aspect of the invention, the host controller controls the client controller to apply a display acknowledgement signal to the display apparatus when the display ID of the display apparatus received from the client is identical to the display ID corresponding to the client ID registered in the database, and the display controller controls to display the image on the display part when the display acknowledgement signal is received from the display apparatus.

According to an aspect of the invention, the host controller requests the transmission of the display ID to the display apparatus when the client is powered, and transmits information that the display ID is not received to the host when the display ID is not received from the display apparatus, and the host controller transmits the display locking signal to the client to implement the lock function when the client transmits the information that display ID is not received.

According to an aspect of the invention, the host further comprises: a host display part to display the image, and the host controller requests transmission of the display ID to the display apparatus when the client is powered, and transmits the information to indicate that the display ID is not received when that the display ID is not received from the display apparatus, and the host controller displays a user interface screen to configure the display ID on the host display part when the client transmits the information that the display ID is not received.

According to an aspect of the invention, the host controller registers the inputted display ID as the display ID corresponding to the client ID of the client when the configuration of the display ID of the display apparatus is selected through the user interface screen and the display ID of the display apparatus is inputted through the input part.

According to an aspect of the invention, the host controller transmits the inputted display ID to the client when a configuration of the display ID of the display apparatus is selected through the user interface screen and the display ID of the display apparatus is inputted through the input part.

According to an aspect of the invention, the client controller transmits the display ID transmitted from the host to the display apparatus, and the display controller stores the display ID transmitted from the client controller in the memory.

According to an aspect of the invention, the host controller transmits the display locking signal to the client to enable the client controller to implement the lock function when the configuration of the display ID of the display apparatus is not selected through the user interface screen.

According to an aspect of the invention, the client controller blocks the image signal applied to the display apparatus from the client when the display locking signal is received.

According to an aspect of the invention, the client controller transmits a control signal corresponding to the display locking signal to the display apparatus when the display locking signal is received, and the display controller controls so that the image on the display part is not displayed when the control signal corresponding to the display locking signal is received.

According to an aspect of the invention, the host controller controls to display the user interface screen on the host display part to manage an operation state of the display apparatus.

According to an aspect of the invention, the host controller transmits a power-off signal corresponding to a selected power-off when the power-off of the display apparatus is selected through the user interface screen, and the client controller controls the display controller to turn off the power of the display apparatus when that the power-off signal is received from the host.

According to an aspect of the invention, the host controller transmits a power-on signal corresponding to a selected power-on when the power-on of the display apparatus is selected through the user interface screen, and the client controller controls the display controller to turn on the power of the display apparatus when the power-on signal is received from the host.

According to an aspect of the invention, the display controller transmits a power-on/off state signal corresponding to a on/off state of the display apparatus through the client, and the host controller displays the power-on/off state of the display apparatus on the user interface screen based on the received power-on/off state signal when the power-on/off state signal is received.

According to an aspect of the invention, the host controller counts a time of the power-on state of the display apparatus based the received power-on/off state signal, and accumulates the time of the counted power-on state to be registered in the database.

According to an aspect of the invention, the display apparatus further comprises: an electrically erasable programmable read only memory (EEPROM) to store configuration variables to control a display state of the image, and the memory has a memory area allocated to store and remove data with respect to the EEPROM.

According to an aspect of the invention, the display controller reads the display ID stored in the memory and transmits the display ID to the client when a client requests the display ID.

According to an aspect of the invention, the display controller detects whether the display acknowledgement signal is received from the client and controls so that the image on the display part is not displayed when the display acknowledgement signal is not received from the client.

BRIEF DESCRIPTION OF THE DRAWINGS

These and/or other aspects and advantages of the present invention will become apparent, and more readily appreciated from the following description of the embodiments, taken in conjunction with the accompany drawings of which.

DETAILED DESCRIPTION OF THE EMBODIMENTS

Reference will now be made in detail to the aspects of the present invention, examples of which are illustrated in the accompanying drawings, wherein like reference numerals refer to like elements throughout. The aspects are described below in order to explain the present invention by referring to the figures.

Figure 1:
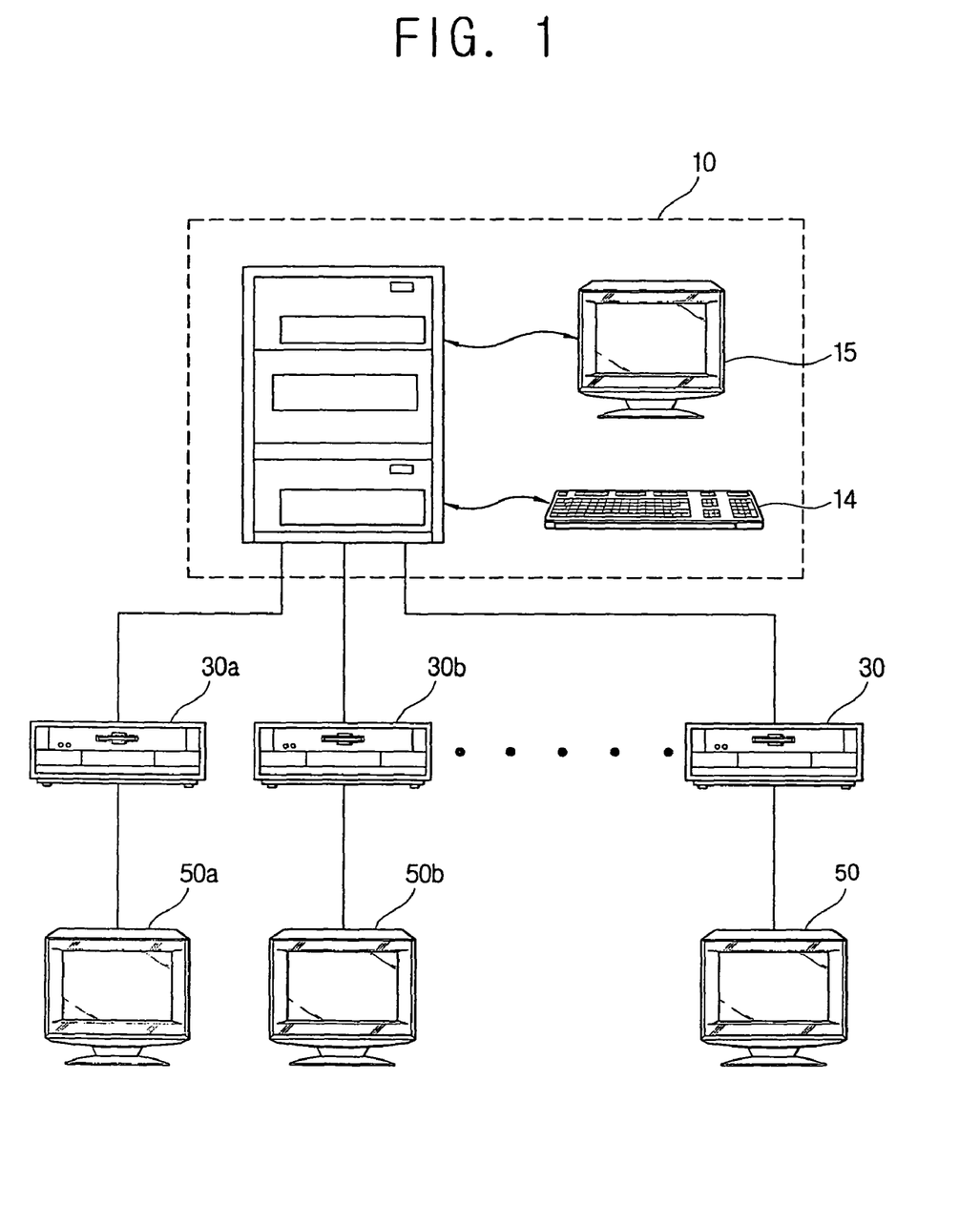
FIG. 1 illustrates a configuration of a display apparatus management system according to an aspect of the present invention.
Figure 2:
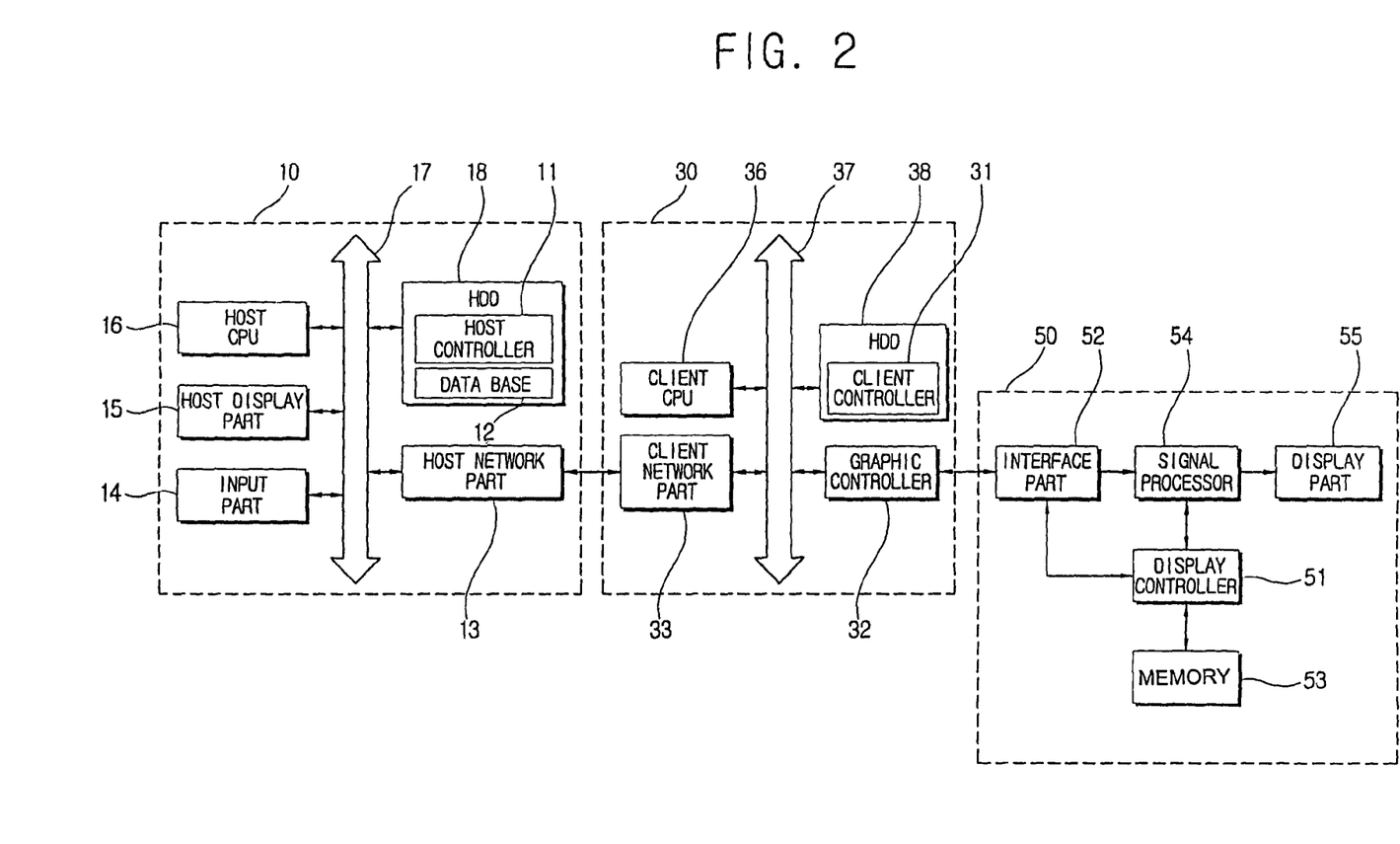
FIG. 2 is a control block diagram of the display apparatus management system shown in FIG. 1.

As shown in FIG. 1 and FIG. 2, a display apparatus management system according to an aspect of the present invention comprises: at least one display apparatus 50, clients 30 connected with the respective display apparatuses 50, and a host connected with each client 30 and a network. As shown in FIG. 2, the display apparatus 50 according to an aspect of the present invention comprises: a display part 55 to display a picture, an interface 52 to receive an image signal outputted from the clients 30, a signal processor 54 to change the image signal inputted from the interface 52 to the image signal displayable via the display part 55, and a display controller 51 to control the above components. However, it is understood that additional components can be used instead of or in addition to the shown components in FIG. 2.

According to an aspect of the present invention, the interface 52 receives the image signal outputted from a graphic controller 32 of the client 30. The image signal received by the interface 52 comprises red, green, blue (R, G, B) signals and a horizontal/vertical synchronization signal (H/V sync signal). According to an aspect of the present invention, the interface 52 is connectible to the graphic controller 32 of the client 30 via a D-sub connector, a digital video interactive (DVI) terminal, or via similar and/or equivalent connectors and methods.

Further, the interface 52 according to an aspect of the present invention supports an interface bilateral exchange of data with the clients 30. According to an aspect of the present invention, the client 30 transmits data with the exception of the image signal, such as various control signals applied to the display controller 51, and the display apparatus 50 transmits the data to the client 30. For example, the interface 52 according to an aspect of the present invention has a display data channel (DDC) function that enables an exchange of the data with the client 30. Further, according to an aspect of the present invention, another interface to exchange data (such as a universal serial bus (USB) interface) is used. Herein, the DDC function is one standard set by the video electronics standard association (VESA) to realize an automatic configuration, or so-called plug-and-play function, which regulates signal lines and order thereof by the D-sub connector when data is exchanged between the graphic controller 32 of the client 30 and the display controller 51 of the display apparatus 50. However, it is understood that other types of interfaces can be used, and that other data exchange protocols, such as firewire and USB 2.0, can be used.

The display part 55 and the signal processor 54 of the display apparatus 50 according to an aspect of the present invention may have various configurations according to the kind of the display apparatus 50 provided. For example, when the display apparatus 50 is a liquid crystal display (LCD), the signal processor 54 comprises an A/D converter to convert the H/V sync signal and the R, G, B signals inputted from the interface 52 to a digital image signal, and a scaler to scale the digital image signal outputted by the A/D converter. Further, when the display apparatus 50 according to an aspect of the present invention is the LCD, the display part 55 comprises an LCD panel to display an image, a panel driver to drive the LCD panel, and a back light unit to supply light to the LCD panel. When, the display apparatus 50 according to an aspect of the present invention is a cathode ray tube (CRT), the signal processor 54 comprises an amplifier to amplify the image signal inputted through the interface 52 and a vertical/horizontal deflector to deflect an electron beam based on the H/V sync signal. Further, when the display apparatus 50 according to an aspect of the present invention is the CRT, the display part 55 comprises a cathode ray tube. However, it is understood that other display technologies, such as plasma display panels (PDPs) or organic light emitting diode displays OLEDs can be used.

The display controller 51 according to an aspect of the present invention controls the signal processor 54 and the display part 55 to control a display state of the image based on variables previously set to control the display state of the image displayed on the display part 55. Herein, the variables are stored in a nonvolatile memory, such as an Electrically Erasable Programmable Read-Only Memory (EEPROM, not shown). Also, the display controller 51 according to an aspect of the present invention implements a control operation corresponding to a control signal received based on a predetermined control signal received from the client 30. The control operation is further described below.

A memory 53 according to an aspect of the present invention is a data storage apparatus that allows data to be stored and/or removed. Herein, the display controller 51 stores display ID transferred from a host controller 11 through the client 30 in the memory 53, reads the stored display ID from the memory 53 according to a request from the client 30, and transfers the display ID to the client 30 via the interface 52. For example, the memory 53 according to an aspect of the present invention is installed with an additional memory 53 to store the display ID, or may be provided by allocating an area of the EEPROM storing the erasable variables. However, it is understood that other types of memory can be used.

The client 30 according to an aspect of the present invention, such as a computer that applies the image signal to the display apparatus 50, comprises a central processing unit (CPU) 36, the graphic controller 32 to process the image signal outputted to the display apparatus 50, a hard disk drive 38 to store an operating system and a plurality of application programs that run based on the operating system, a client network part 33 to process exchange of data with the host 10, and a system bus 37 to mutually connect the above components. According to an aspect of the invention, the graphic controller 32 supports the DDC function to enable a bilateral communication with the display apparatus 50, and separately comprises a USB interface (not shown) corresponding to the USB interface of the display apparatus 50 when the interface 52 of the display apparatus 50 supports the USB interface.

Further, a client controller 31 according to an aspect of the present invention controls the display controller 51 to control a display state of the image displayed on the display part 55. According to an aspect of the present invention, the client controller 31 displays a user interface screen to set the display state of the image on the display apparatus 50. Further, when the user sets configuration variables through the user interface screen, the client controller 31 applies a control signal corresponding to the configuration variables set through the user interface screen to the display apparatus 50 through the graphic controller 32. Herein, the display controller 51 of the display apparatus 50 reconfigures the configuration variables used to control the display state of the image displayed on the display part 55 based on the control signal corresponding to the received configuration variables, and stores the configuration variables in the EEPROM. The display controller 51 controls the display state of the image displayed on the display part 55 based on the reconfigured configuration variables.

Further, the client controller 31 requests transmission of the display ID to the display apparatus 50 when the display apparatus 50 is initially connected with the client 30. The client controller 31 transmits confirmation on whether the display ID is received from the display apparatus 50, or information on the display ID when the display ID is received to the host 10.

According to an aspect of the present invention, the client controller 31 applies the control signal corresponding to the display apparatus 50 according to a predetermined control signal received from the host 10, or implements a predetermined control operation corresponding to the received control signal, which will be described below in detail.

Herein, the client controller 31 according to an aspect of the present invention is an application program that runs based on the operation system of the client 30, and is installed and stored in the hard disk drive 38. The host 10 according to an aspect of the present invention, such as a server, is connected with each client 30 through a network such as local area network (LAN), and relays/manages transmission and reception of the data between the clients 30 and/or an exchange of the data between networks, such as Internet, and each host 10. However, it is understood that the connection can be through other networks, both wired and wireless.

The host 10 according to an aspect of the present invention comprises: a host CPU 16, a hard disk drive 18 to store the operation system or the plurality of programs that run based on the operation system, a host network part 13 to process the exchange of the data with each client 30, a host display part 15 to display the image, an input part 14 with which the user inputs key signals, and a system bus 17 to mutually connect the above components. According to an aspect of the present invention, the host 10 comprises: a database 12 registered with the display ID of the display apparatus 50 inputted through the input part 14 and a client ID given to each client 30, and a host controller 11 to manage/control the display apparatus 50. While shown as within the host 10, it is understood that the database 12 can be disposed on a recording medium outside of the host 10, such as a removable media or media connected with the host 10 across a network.

According to an aspect of the present invention, the client ID of each client 30 registered in the database 12 is input through the host 10 by the user when the host 10 is connected with the client 30. Further, according to an aspect of the present invention, when the client 30 is connected, the host controller 11 automatically registers the client ID using an IP address allocated to each client 30. Moreover, the display ID registered in the database 12 is registered corresponding to the client ID of the client 30 connected with the respective display apparatus 50 corresponding to the display ID. Accordingly, the user identifies the information on the display apparatus 50 connected with each client 30 through the host 10.

According to an aspect of the present invention, the database 12 stores information in relation to an on/off-state of each display apparatus 50, and an accumulated time during the on-state of each display apparatus 50. Accordingly, the user identifies the on/off state of each display apparatus 50 through the host 10, and checks the time during which the display apparatus 50 is used. The operation to store the information on the on/off state of the display apparatus 50 and the accumulated time during the on-state of each display apparatus 50 will be described below.

According to an aspect of the present invention, the database 12 is registered with an Extended Display Identification Data (EDID) data of the display apparatus 50 corresponding to each registered display ID. Accordingly, the user identifies information, such as a product name and display specification of each display apparatus 50, through the EDID data of each display apparatus 50 registered in the database 12.

Figure 3:
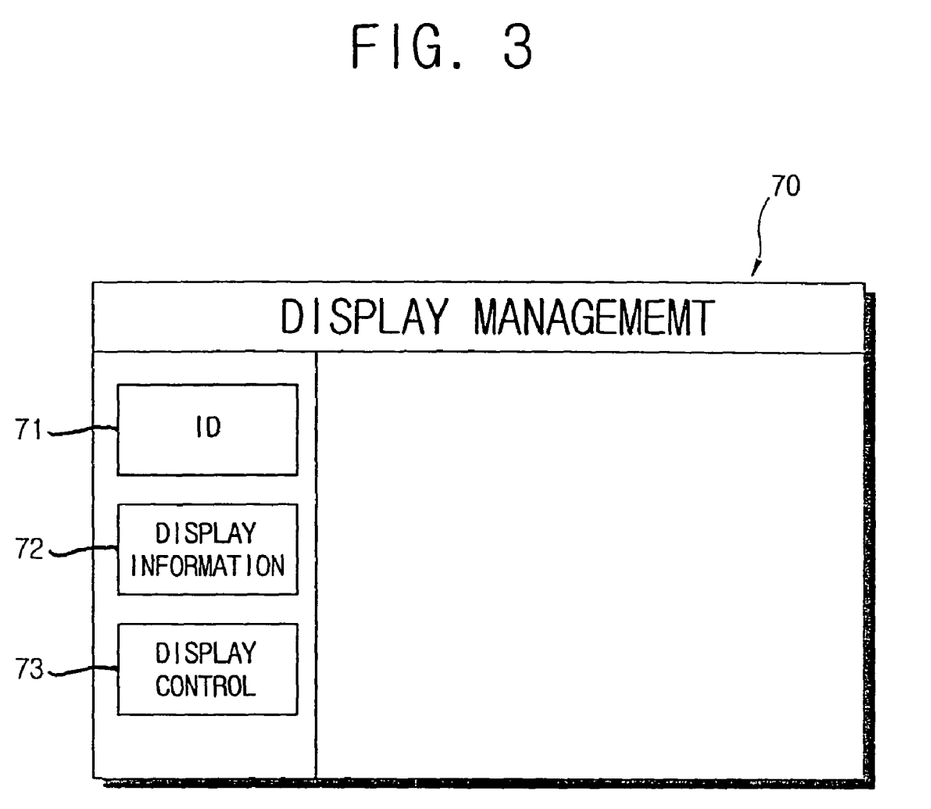
FIG. 3 illustrates a user interface screen according to an aspect of the present invention.

The host controller 11 according to an aspect of the present invention provides a user interface screen 70 to manage the display apparatus 50. The host controller 11 controls to display the user interface screen 70 on the host display part 15 when the user requests. According to an aspect of the present invention, the user inputs the display ID of the display apparatus 50, or receives information on the display apparatus 50 and/or controls the display apparatus 50 through the user interface screen 70.

FIG. 3 illustrates the user interface screen 70 according to an aspect of the present invention. As shown therein, the user interface screen 70 comprises: an ID selection button 71 to activate a window to allow input of the display ID, an information selection button 72 to activate a window to receive the information in relation to the display apparatus 50, and a control selection button 73 to activate a window to control the display apparatus 50. The user interface screen 70 according to an aspect of the present invention may be in various forms, thus the buttons activated according to the respective selection of buttons 71, 72, and 73 can be realized in various forms, and/or be associated with other functions.

According to an aspect of the present invention, when the user inputs the display ID via the user interface screen 70 using the input part 14, the host controller 11 transmits the display ID to the display apparatus 50 through the client 30 corresponding to the inputted display ID. Further, the display controller 51 of the display apparatus 50 that receives the display ID stores the received display ID in the memory 53.

Herein, the host controller 11 according to an aspect of the present invention is an application program that runs on the operating system of the host 10, and is installed and stored in the hard disk drive 18.

Herein below, an operation to register the display ID, for example, when the client 30 is supplied with power by the display apparatus management system according to an aspect of the present invention is described with reference to FIGS. 4A through 4C. While not required in all aspects of the invention, it is understood that the method of FIGS. 4A through 4C can be implemented by computer software implemented on one or more processors or controllers, where the computer software is stored on at least one computer readable medium.

Figure 4A:
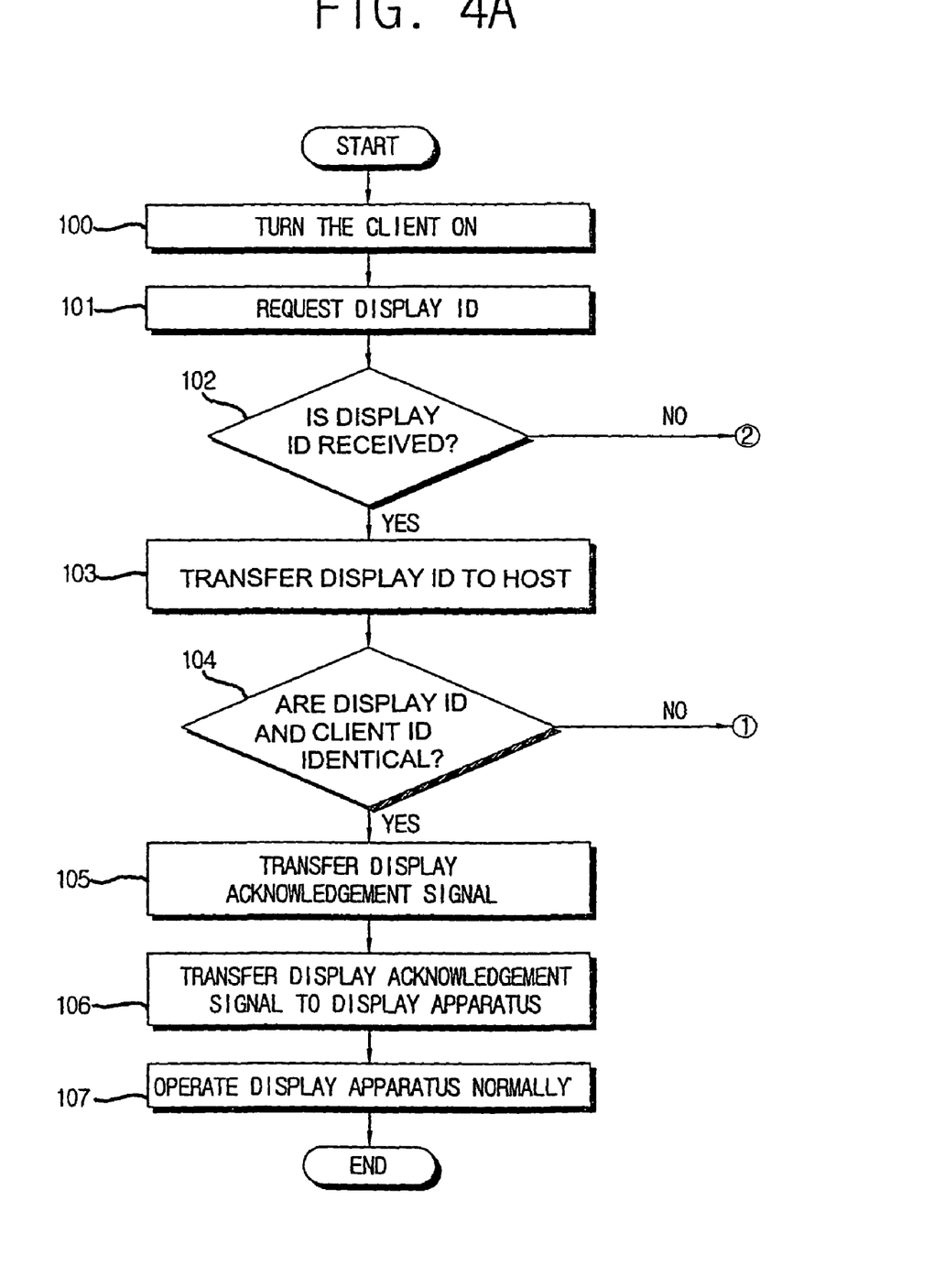
FIGS. 4A through 4C are control flow charts of a management method of the display apparatus management system shown in FIG. 1.

As shown in FIG. 4A, when the client 30 and the display apparatus 50 are supplied with the power and the client 30 is connected with the display apparatus 50 at operation 100, the client controller 31 requests transmission of the display ID to the display apparatus 50 at operation 101, and waits to receive the display ID from the display apparatus 50 at operation 102.

When the display ID is received from the display apparatus 50, the client controller 31 transmits the display ID received from display apparatus 50 to the host 10 through the client network part 33 at operation 103. In this case, the memory 53 of the display apparatus 50 stores the display ID in advance, and the display controller 51 reads the stored display ID from the memory 53 according to the request of the client 30 and transmits the display ID to the client 30 through the interface 52.

When the display ID is received through the host network part 13, the host controller 11 determines whether the received display ID is identical to the display ID previously registered in the database 12 at operation 104.

Herein, upon determining that the display ID received through the host network part 13 is identical to the display ID registered in the database 12, the host controller 11 transmits a display acknowledgement signal through the host network part 13 at operation 105. Herein, when the display acknowledgement signal is received through the client network part 33 from the host 10, the client controller 31 relays the display acknowledgement signal to the display apparatus 50 at operation 106. Further, when the display acknowledgement signal is received through the interface 52 from the client 30, the display controller 51 controls to normally display the image displayed on the display part 55 based on configuration variables previously stored in the EEPROM at operation 107.

In operation 104, when the display ID received through the host network part 13 is not identical to the display ID registered in the database 12, the host controller 11 displays the user interface screen 70 to allow the display ID to be set using the host display part 15. According to an aspect of the present invention, when the display ID is not identical to the display ID previously registered in the database 12, t the database 12 is not registered with the display ID corresponding to the client ID. According to an aspect of the present invention, the user interface screen 70 displays a warning message to indicate the display ID does not match.

Figure 4B:
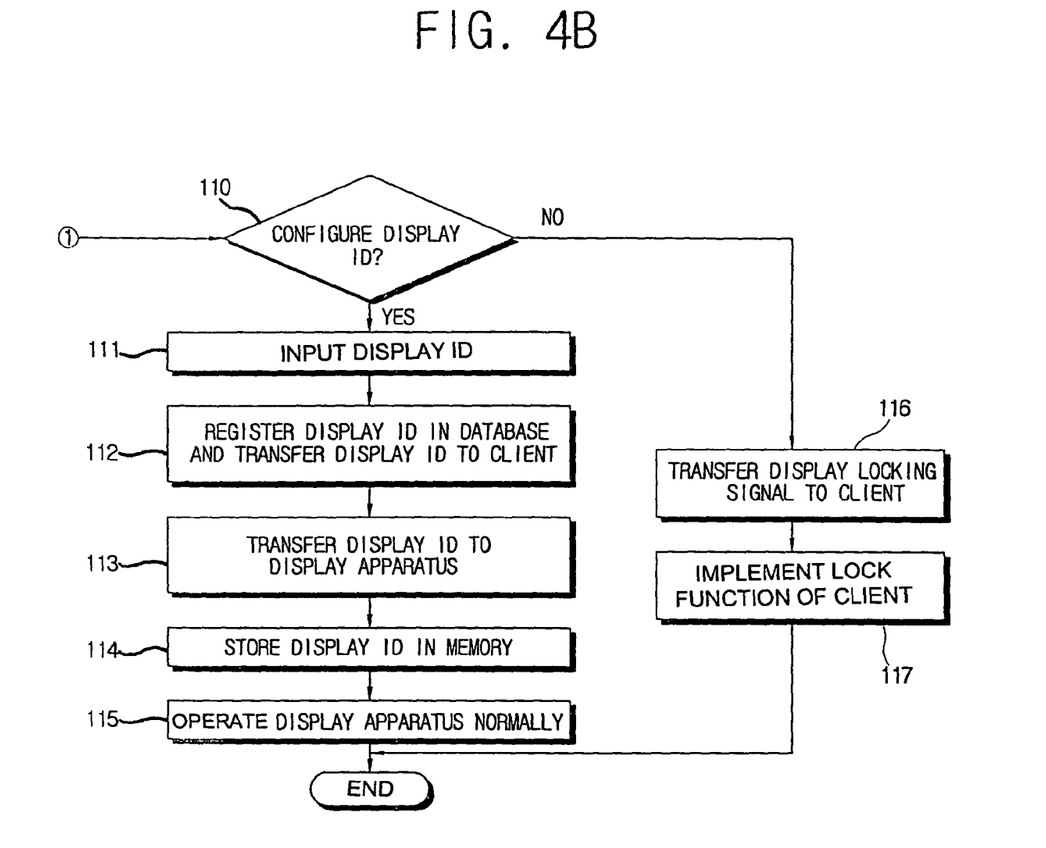

At operation 110 shown in FIG. 4B, the user determines whether to set the display ID through the user interface screen 70. Herein, when the user selects a setting of the display ID and inputs the display ID through the input part 14 at operation 111, the host controller 11 registers the display ID inputted through the input part 14 as the display ID corresponding to the client ID of the corresponding client 30 in the database 12 at operation 112. Further, the host controller 11 transmits the display ID inputted through the input part 14 to the client 30 through the host network part 13 at operation 112.

When the display ID is received from the host 10 through the client network part 33, the client controller 31 transmits the received display ID to the display apparatus 50 at operation 113.

When the display ID is received from the client 30 through the interface 52, the display controller 51 stores the received display ID in the memory 53 at operation 114.

According to an aspect of the present invention, the host controller 11 transmits the display acknowledgement signal when transmitting the display ID inputted through the input part 14. And the client controller 31 transmits the display acknowledgement signal together when transmitting the display ID to the display apparatus 50. According to an aspect of the present invention, the display controller 51 controls the display apparatus 50 to accurately display the image displayed on the display part 55 when the display acknowledgement signal is received from the client 30. Further, when the display ID is received from the host 10, the client controller 31 recognizes the display ID as the display acknowledgement signal to generate/transmit additional display acknowledgement signal to the display apparatus 50. When the display ID is received, the display controller 51 recognizes the received display ID as the display acknowledgement signal to implement a same function.

In operation 110, when the user does not select to set the display ID through the user interface screen 70, the host controller 11 transmits a display locking signal corresponding to a lock function to the client 30 through the host network part 13 at operation 116.

Herein, the client controller 31 implements the predetermined lock function when the display locking signal is received through the client network part 33 at operation 117. Herein, according to an aspect of the present invention, the lock function by the client controller 31 comprises a function that the client controller 31 blocks the image signal applied to the display apparatus 50.

According to another aspect of the present invention, the lock function by the client controller 31 comprises a function that the client controller 31 applies a control signal corresponding to the received display locking signal to the display apparatus 50. Herein, when the control signal corresponding to the display locking signal is received from the client 30 through the interface 52, the display controller 51 controls the display apparatus 50 such that the image on the display part 55 is not displayed. For example, the display controller 51 controls the signal processor 54 such that the image on the display part 55 is not displayed, and may block the image signal inputted from the interface 52.

According to an aspect of the present invention, when the display ID is not received from the display apparatus 50, the client controller 31 transmits information that the display ID is not received to the host 10 at operation 120. Herein, when the display ID is not received from the display apparatus 50, a display ID is not previously stored in the memory 53 of the display apparatus 50, and/or the display apparatus 50 does not support a function of the display apparatus 50.

When the host controller 11 receives the information that the display ID is not received through the host network part 13 from the client 30, the host controller 11 displays the user interface screen 70 on the host display part 15 at operation 121. Herein, the user selects whether the display ID is set through the user interface screen 70 at operation 122. Herein, when the user selects to configure the display ID through the user interface screen 70 and inputs the display ID with the input part 14 at operation 122, the host 10, the client 30, and the display apparatus 50 implement operations 124 through 127 corresponding to operations 112 through 115, respectively. Herein, the display ID is stored to the memory 53 of the display apparatus 50 at operation 126, and the image is normally displayed on the display apparatus 50 at operation 127. A description of operations 124 through 127 shown in FIG. 4C are omitted because the operations correspond to operations 112 through 115 previously described.

Figure 4C:
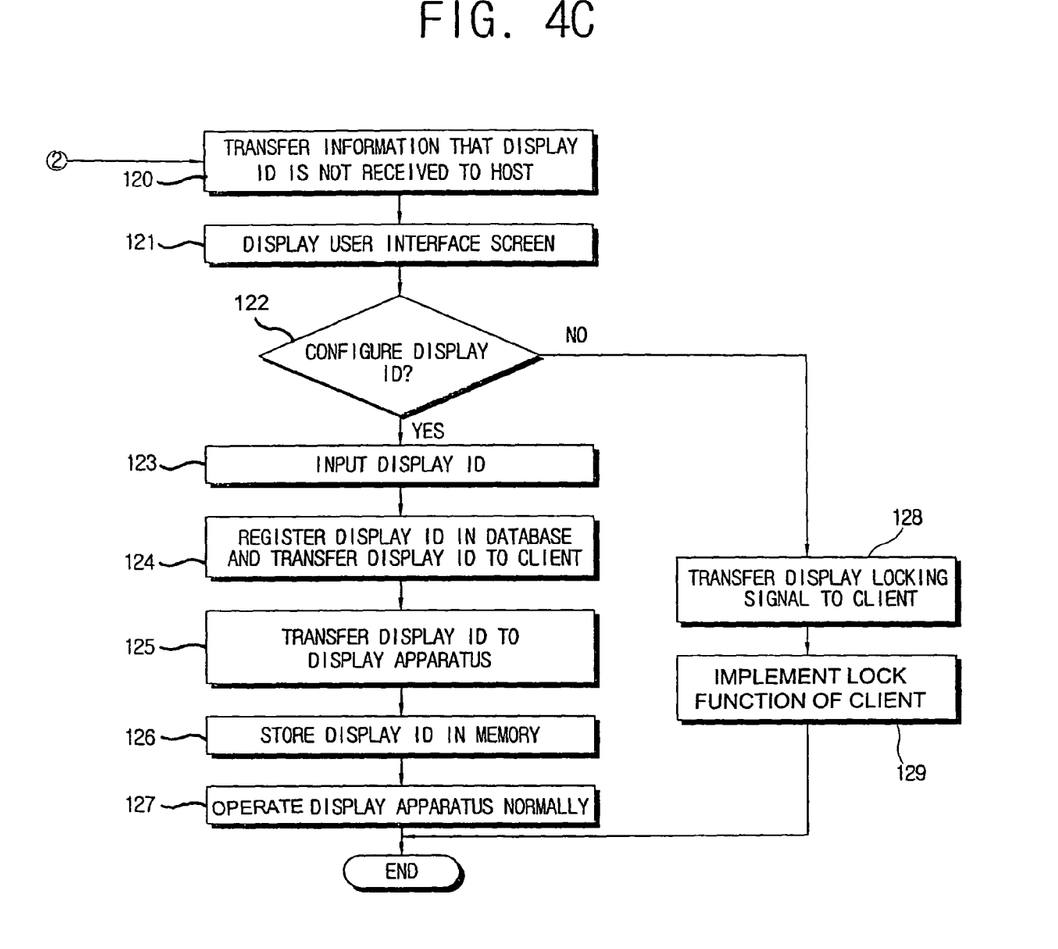

According to operation 122 in FIG. 4C, when the user chooses not to configure the display ID through the user interface screen 70, operations 128 and 129 corresponding to operations 116 and 117 are implemented. A description of operations 128 and 129 shown in FIG. 4C are omitted because the operations correspond to operations 116 and 117 previously described.

According to an aspect of the present invention, when the display ID and the client ID are not identical at operation 104, or when the host 10 receives the information that the display ID is not received, the host controller 11 transmits the display locking signal to the client 30 regardless of whether the display ID is configured. Therefore, when the display ID is inputted, the host controller 11 transmits the display ID and/or the display acknowledgement signal to the client 30.

Figure 5:
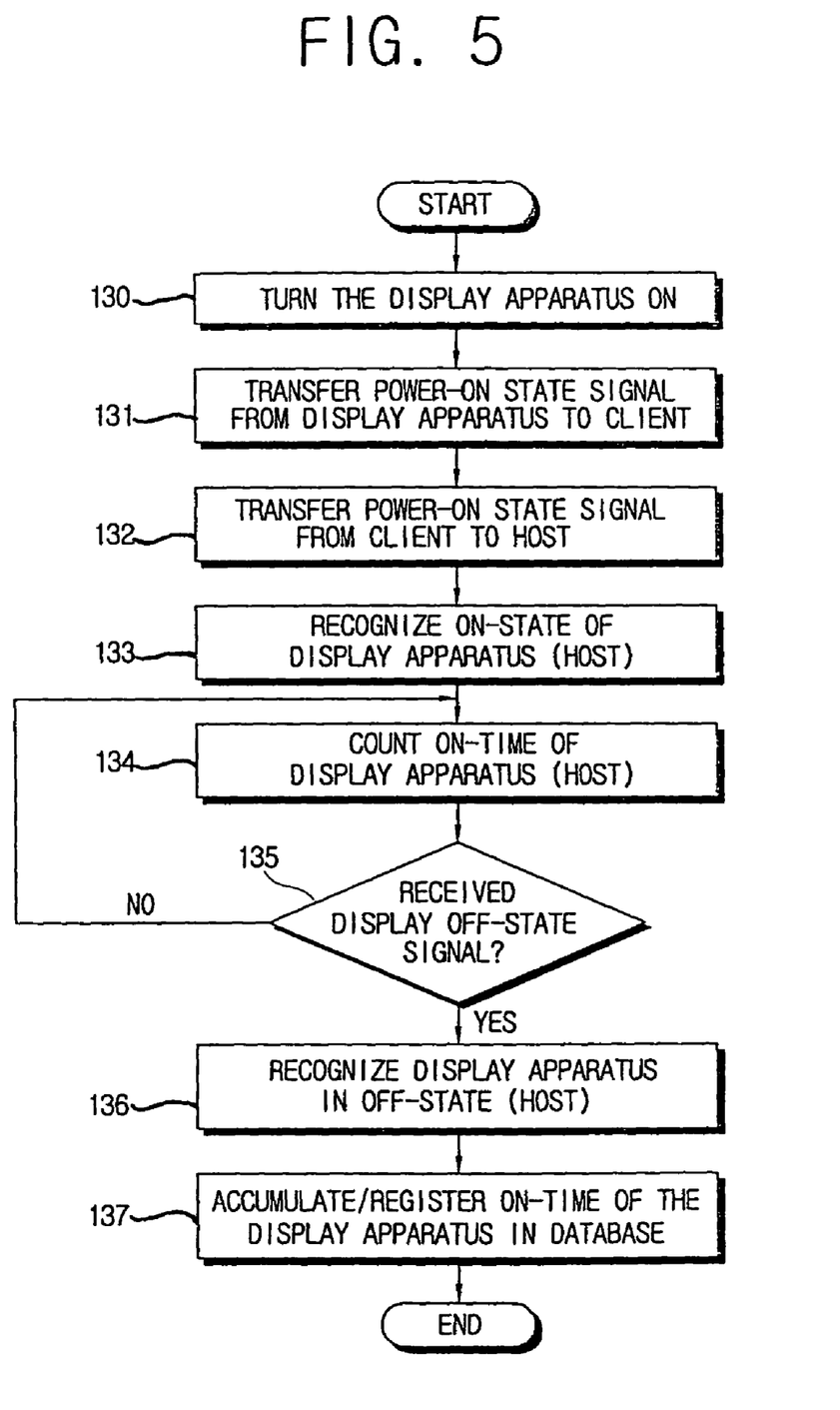
FIG. 5 is a control flow chart of a display management method of the display apparatus management system according to an aspect of the present invention.

Herein below, a management method of a display apparatus management system according to an aspect of the present invention will be described with reference to FIG. 5. When describing the management method of the display apparatus management system according to an aspect of the present invention, it is assumed that the display apparatus management system implements a normal operation in accordance with the client ID of the client 30 and the display ID of the display apparatus 50 previously registered in the database 12.

First, when the display apparatus 50 is supplied with power at operation 130, the display controller 51 supplies the client 30 through the interface 52 with a power-on state signal corresponding to a state that the client 30 is powered on at operation 131. When the power-on state signal is received from the display apparatus 50, the client controller 31 transmits the received power-on state signal to the host 10 through the client network part 33 at operation 132.

When the power-on state signal is received through the host network part 13, the host controller 11 recognizes that the display apparatus 50 is in an on-state at operation 133 and begins counting a time during which the display apparatus 50 is in the on-state at operation 134.

The host controller 11 checks if a power-off state signal is received through the host network part 13 at operation 135. When the power-off state signal is received, the host controller 11 recognizes that the display apparatus 50 is in an off-state at operation 136 and accumulates the time counted as the on-state of the display apparatus 50 to an on-state time of the display apparatus 50 previously registered. Accordingly, the host controller 11 registers the accumulated time in the database 12 at operation 137. Herein, the power-off state signal received through the host network part 13 is transmitted using operations similar to operations 130 through 132 shown in FIG. 5.

Herein, the host controller 11 reads information regarding usage time of each display apparatus 50 from the database 12 to provide the information in relation to the usage of time through the user interface screen 70 when the user requests the information. Accordingly, the user may check a total usage time of each display apparatus 50 to determine status of the display apparatus and prevent unauthorized power-off of the display apparatus.

Herein below, a management method of a display apparatus management system according to an aspect of the present invention will be described.

First, in a state that the host 10 and the client 30 are turned on, the user may identify the on/off state of the display apparatus 50 as identified by the management method of the display apparatus management system, according to the method described above in FIG. 5, using the user interface screen 70.

Herein, when the user wants to turn on or off a particular display apparatus 50, the user selects a power-on/off function of the corresponding display apparatus 50 through the user interface screen 70.

Herein, when the user selects the power-on/off function, the host controller 11 applies a control signal corresponding to the power-on/off function to the display apparatus 50 through client 30, and the display apparatus 50 is turned on or off according to the received control signal.

Herein, the display controller 51 transmits the power-on/off state signal to the host 10 through the client 30 using the management method according to an aspect of the present invention.

According to an aspect of the present invention, the host controller 11 and/or the client controller 31 transfers the display acknowledgement signal and/or a control signal corresponding to the lock function to the display apparatus 50, and the display controller 51 determines whether to display the image normally based on the display acknowledgement signal and the control signal corresponding to the lock function. However, according to an aspect of the present invention, the display controller 51 controls such that the image on the display part 55 is not displayed when the display acknowledgement signal is not received from the client 30, regardless of whether the control signal corresponding to the lock function is received. According to an aspect of the present invention, the client controller 31 includes the information on the display ID corresponding to the corresponding client ID registered in the database 12 of the host 12. Accordingly, when the display apparatus 50 having the display ID corresponding to the client ID is connected, the client controller 31 implements a normal operation of the display apparatus 50 without additional identification operation by the host 10 by transmitting the display acknowledgement signal to the display apparatus 50. Further, when the display ID is not received from the display apparatus 50, or when the received display ID is different from the display ID corresponding to the corresponding client ID, the client controller 31 provides the lock function to the display apparatus 50 by not transferring the display acknowledgement signal to the display apparatus 50, regardless of whether the display ID is configured from the host 10.

Thus, a display apparatus management system according to an aspect of the present invention identifies/manages the display apparatus 50 connected with each client 30 from the host 10 by providing at least one display apparatus 50 including the display part 55 to display the image, the memory 53 to store and remove the data, and the display controller 51 to control the display state of the image displayed on the display part 55; at least one client 30 connected with each display apparatus 50, to apply the image signal; and the host 10 having the input part 14 to input the respective display ID of each display apparatus 50, the database 12 registered with the display ID of each display apparatus 50 inputted with the input part 14 and the client ID given to each client 30, and the host controller 11 to transfer the display ID to the display apparatus 50 through the client 30 so that the display controller 51 controls to store the display ID in the memory 53.

Further, because the display controller 51 detects display acknowledgement signal from the client 30 and controls such that the image on the display part 55 is not displayed when the display acknowledgement signal is not received from the client 30, the host 10 detects when the display apparatus 50 is stolen or connected with another computer.

While described in terms of displays, it is understood that the present invention can be used to identify and/or control additional components connected with a client, such as printers, cameras, personal digital assistants (PDAs), audio equipment, and/or network home appliances. Moreover, while described in terms of turning the client on and off, it is understood that the host can provide other control signals to control the client and/or other devices connected with the client.

The display apparatus management system according to an aspect of the present invention identifies and/or manages the display apparatus connected with each client from the host.

Further, because the lock function to the display apparatus is implemented, the present invention provides protection against theft.

Although a few embodiments of the present invention have been shown and described, it will be appreciated by those skilled in the art that changes may be made in these aspects without departing from the principles and spirit of the invention, the scope of which is defined in the appended claims and their equivalents.

What is claimed is:

1. A display apparatus management system, comprising:
at least one display apparatus including:
  a display part to display an image,
  a memory to allow data to be stored and/or removed, and
  a display controller to control a display state of the image displayed on the display part;
at least one client connected with the at least one display apparatus to output an image signal generated at the at least one client to the at least one display apparatus, the at least one client including a client controller to control the display controller, which controls the display state of the image displayed on the display part; and
a host communicating with the at least one client including:
  an input part to allow input of a display identification,
  a database in which is registered the display identification of the at least one display apparatus which was inputted via the input part, and a client identification provided to the at least one client corresponding to the display identification of the at least one display apparatus connected with the at least one client, and
  a host controller to transmit the display identification to the at least one display apparatus via the at least one client to enable the display controller to store the display identification to the memory,
wherein the at least one client requests a transmission of the display identification to the at least one display apparatus from the host when the at least one client is powered and receives the stored display identification from the at least one display apparatus when the at least one client is connected to the at least one display apparatus, and transmits the display identification to the host when the display identification is received from the at least one display apparatus, and
wherein the host controller transmits a display locking signal to the at least one client to enable the at least one client to implement a lock function when the display identification of the at least one display apparatus received from the at least one client is not identical to the display identification corresponding to the client identification registered in the database,
wherein the display identification transmitted from the at least one display apparatus to the at least one client is stored in the memory of the at least one display apparatus prior to transmission, and
wherein the host controller transmits a control signal to the client controller to enable the client controller to control the display controller.

2. The display apparatus management system according to claim 1, wherein the host controller controls the at least one client to apply a display acknowledgement signal to the at least one display apparatus when the display identification of the at least one display apparatus received from the at least one client is identical to the display identification corresponding to the client identification registered in the database, and the display controller controls the display apparatus to display the image on the display part when it is detected that the display acknowledgement signal is received from the at least one display apparatus.

3. The display apparatus management system according to claim 1, wherein the host controller requests a transmission of the display identification to the at least one display apparatus when the at least one client is powered, and transmits information to indicate that the display identification is not received to the host when the display identification is not received from the at least one display apparatus, and the host controller transmits a display locking signal to the at least one client to implement the lock function when the at least one client transmits the information that the display identification is not received.

4. The display apparatus management system according to claim 1, wherein the host further comprises: a host display part to display the image, and wherein the host controller requests a transmission of the display identification to the at least one display apparatus when the at least one client is powered, and transmits information to indicate that the display identification is not received when the display identification is not received from the at least one display apparatus, and the host controller displays a user interface screen to allow a configuration of the display identification via the host display part when the at least one client transmits the information that the display identification is not received.

5. The display apparatus management system according to claim 4, wherein the host controller registers a configured display identification as the display identification corresponding to the client identification of the at least one client when the configuration of the display identification of the at least one display apparatus is selected through the user interface screen and the display identification of the at least one display apparatus is inputted through the input part.

6. The display apparatus management system according to claim 4, wherein the host controller transmits a configured display identification to the at least one client when the configuration of the display identification of the at least one display apparatus is selected through the user interface screen and the display identification of the at least one display apparatus is inputted through the input part.

7. The display apparatus management system according to claim 6, wherein the client controller transmits the display identification transmitted from the host to the at least one display apparatus, and
the display controller stores the display identification transmitted from the client controller in the memory.

8. The display apparatus management system according to claim 4, wherein the host controller transmits a display locking signal to the at least one client to enable the client controller to implement a lock function when the configuration of the display identification of the at least one display apparatus is not selected through the user interface screen.

9. The display apparatus management system according to claim 1, wherein the client controller blocks the image signal applied to the at least one display apparatus from the at least one client when the display locking signal is received.

10. The display apparatus management system according to claim 3, wherein the client controller blocks the image signal applied to the at least one display apparatus from the at least one client when the display locking signal is received.

11. The display apparatus management system according to claim 8, wherein the client controller blocks the image signal applied to the at least one display apparatus from the at least one client when the display locking signal is received.

12. The display apparatus management system according to claim 1, wherein the at least one client transmits a control signal corresponding to the display locking signal to the at least one display apparatus when the display locking signal is received, and
the display controller controls so that the image on the display part is not displayed when the control signal corresponding to the display locking signal is received.

13. The display apparatus management system according to claim 3, wherein the client controller transmits a control signal corresponding to the display locking signal to the at least one display apparatus when the display locking signal is received, and
the display controller controls the display apparatus so that the image on the display part is not displayed when the control signal corresponding to the display locking signal is received.

14. The display apparatus management system according to claim 8, wherein the client controller transmits a control signal corresponding to the display locking signal to the at least one display apparatus when the display locking signal is received, and
the display controller controls the display apparatus so that the image on the display part is not displayed when the control signal corresponding to the display locking signal is received.

15. The display apparatus management system according to claim 1, wherein the host controller controls to display a user interface screen on the host display part to manage an operation state of the at least one display apparatus.

16. The display apparatus management system according to claim 15, wherein the host controller transmits a power-off signal corresponding to a selected power-off option when the power-off of the at least one display apparatus is selected through the user interface screen, and
the client controller controls the display controller to turn off the power of the at least one display apparatus when the power-off signal is received from the host.

17. The display apparatus management system according to claim 15, wherein the host controller transmits a power-on signal corresponding to a selected power-on option when the power-on of the at least one display apparatus is selected through the user interface screen, and
the client controller controls the display controller to turn on the power of the at least one display apparatus when the power-on signal is received from the host.

18. The display apparatus management system according to claim 15, wherein the display controller transmits a power-on/off state signal corresponding to a on/off state of the at least one display apparatus through the at least one client, and
the host controller displays the power-on/off state of the at least one display apparatus on the user interface screen based on the received power-on/off state signal when the power-on/off state signal is received.

19. The display apparatus management system according to claim 18, wherein the host controller counts a time of the power-on state of the at least one display apparatus based on the received power-on/off state signal, and registers the time counted during the power-on state in the database.

20. The display apparatus management system according to claim 1, wherein the at least one display apparatus further comprises:
an electrically erasable programmable read only memory to store configuration variables to control the display state of the image, and
the memory has a memory area allocated to allow data to be stored in and/or data to be removed from the electrically erasable programmable read only memory.

21. The display apparatus management system according to claim 1, wherein the display controller reads the display identification stored in the memory and transmits the display identification to the at least one client when a user requests the display identification.

22. The display apparatus management system according to claim 1, wherein the display controller detects whether a display acknowledgement signal is received from the at least one client and controls so that the image on the display part is not displayed when the display acknowledgement signal is not received from the at least one client.

23. The display apparatus management system according to claim 1, wherein the at least one display apparatus further comprises:
an interface part to receive the image signal from the at least one client, and
a signal processor to change the image signal inputted via the interface part to an image signal displayable via the display part.

24. The display apparatus management system according to claim 23, wherein the display controller controls the display part, the interface part, and the signal processor.

25. The display apparatus management system according to claim 1, wherein the client further comprises:
a central processing unit,
a graphic controller to process the image signal outputted to the at least one display apparatus,
a hard disk drive to store an operating system and application programs that run based on the operating system,
a client network part to process exchange of data with the host, and
a system bus to connect the central processing unit, the hard disk drive, and the client network part.

26. The display apparatus management system according to claim 25, wherein the host controller displays a user interface screen to allow a configuration of the display identification, wherein when the user sets configuration variables through the user interface screen, the client controller transmits a control signal corresponding to the configuration variables set through the user interface screen to the at least one display apparatus through the graphic controller.

27. The display apparatus management system according to claim 1, wherein the client controller is an application program that runs based on an operating system of the at least one client.

28. The display apparatus management system according to claim 26, wherein a user interface window is provided to allow a user to configure the display identification data.

29. The display apparatus management system according to claim 28, wherein the user interface window comprises:
an identification selection button to allow input of the display identification data,
an information selection button to receive the display identification data, and
a control selection button to control the display apparatus.

30. A method to manage a display apparatus of a client computer connected to a host, comprising:
registering client identification data of the client computer connected to the display apparatus in the host connected to the client computer, the client computer outputting an image signal generated at the client computer to the display apparatus;
transmitting display identification data of the display apparatus to the host upon a request, the request being made by the client when the client is powered and connected to the display apparatus, the display identification data being stored in a memory of the display apparatus;
determining at the host whether the transmitted display identification data of the display apparatus matches a registered display identification data;
controlling the display apparatus with the client if the determination is made that the transmitted display identification data of the display apparatus and the registered display identification data match; and
determining whether configured display identification data by the user corresponds with the registered client identification data,
wherein a display locking signal is transmitted to the client computer when the configured display identification data by the user does not correspond with the registered client identification data and the display apparatus is controllable by the client when the configured display identification data does correspond with the registered client identification data, and
wherein the host transmits a control signal to the client to enable the client to control the display apparatus, the display apparatus controlling a display state of a displayed image;
wherein the host, the client, and the display apparatus each comprise at least a processor.

31. The method to manage the display apparatus according to claim 30, further comprising:
transmitting a display acknowledgement signal to the display apparatus via the host upon determining that the transmitted display identification data matches the registered display identification data, and operating the display apparatus in accordance with a normal operation, and
displaying a user interface screen when the display identification data does not match the registered display identification data to allow configuration of the display identification data by a user.

32. The method to manage the display apparatus according to claim 31, wherein the user interface screen is displayed when the display identification data is not registered.

33. The method to manage the display apparatus according to claim 32, further comprising:
transmitting a display locking signal to the client computer connected with the display apparatus to stop an image signal outputted to the display apparatus when the display acknowledgement signal is not received by the display apparatus.

34. A non-transitory computer readable medium encoded with a method to manage a display apparatus performed by a computer connected with the display apparatus and connected with a host, the method comprising:
registering client identification data of the client computer connected to the display apparatus in the host connected to the client computer, the client computer outputting an image signal generated at the client computer to the display apparatus;
transmitting display identification data of the display apparatus to the host upon a request, the request being made by the client when the client is powered and connected to the display apparatus, the display identification data being stored in a memory of the display apparatus;
determining at the host whether the transmitted display identification data of the display apparatus matches a registered display identification data;
controlling the display apparatus with the client if the determination is made that the transmitted display identification data of the display apparatus and the registered display identification data match; and determining whether configured display identification data by the user corresponds with the registered client identification data, wherein a display locking signal is transmitted to the client computer when the configured display identification data by the user does not correspond with the registered client identification data and the display apparatus is controllable by the client when the configured display identification data does correspond with the registered client identification data, and wherein the host transmits a control signal to the client to enable the client to control the display apparatus, the display apparatus controlling a display state of a displayed image.

* * * * *